(12) United States Patent
Datta et al.

(10) Patent No.: US 7,014,122 B2
(45) Date of Patent: Mar. 21, 2006

(54) METHOD AND APPARATUS FOR PERFORMING BIT-ALIGNED PERMUTE

(75) Inventors: Ramyanshu Datta, Austin, TX (US); Robert Kevin Montoye, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 84 days.

(21) Appl. No.: 10/745,730

(22) Filed: Dec. 24, 2003

(65) Prior Publication Data

US 2005/0139647 A1   Jun. 30, 2005

(51) Int. Cl.
*G06K 19/06* (2006.01)

(52) U.S. Cl. ..................................... 235/494; 235/487

(58) Field of Classification Search ................ 712/228, 712/32; 395/375, 80; 235/494, 487, 380, 235/375
See application file for complete search history.

(56) References Cited

U.S. PATENT DOCUMENTS

| 5,481,685 A | * | 1/1996 | Nguyen et al. | ............. 712/244 |
| 5,805,850 A | * | 9/1998 | Luick | ......................... 712/215 |
| 2002/0091916 A1 | * | 7/2002 | Dowling | .................... 712/228 |

* cited by examiner

*Primary Examiner*—Karl D. Frech
(74) *Attorney, Agent, or Firm*—Casimer K. Salys; Dillon & Yudell LLP

(57) ABSTRACT

A method and apparatus for performing bit-aligned permute are disclosed. A select register, a pair of data registers and a target register are provided. The entries of the select register is preloaded with a set of bit indices. Each of the bit indices points to a desired bit location within the data registers. The byte information stored in the data registers are then copied to the target register according to the bit indices within the select register.

6 Claims, 5 Drawing Sheets

METHOD AND APPARATUS FOR PERFORMING BIT-ALIGNED PERMUTE

BACKGROUND OF THE INVENTION

1. Technical Field

The present invention relates to a method and apparatus for data processing in general, and in particular to a method and apparatus for performing a permute instruction. Still more particularly; the present invention relates to a method and apparatus for performing a bit-aligned permute instruction within a data processing system.

2. Description of Related Art

The proliferation of multimedia applications lead to an increased demand for processors that have multimedia facilities. One example of such processors is the PowerPC™ processors manufactured by the International Business Machines Corporation of Armonk, N.Y. The multimedia facility for the PowerPC™ processors is the vector multimedia extension (VMX).

For processors that have a vector-based processing architecture, such as the PowerPC™ processors, it is possible to use permute instructions to perform multiple lookup operations. Basically, each permute instruction can store two operands into a result vector in any desirable order. Thus, in an architecture that employs, for example, 128-bit registers, the permuted values from a table can be selectively loaded into one of the 128-bit registers with one instruction, to store 16 bytes of data, which thereby permits 16 table lookup operations to be performed simultaneously.

A permute instruction operates to fill a register with data values from any two other registers and the data values can be specified in any order. Referring now to the drawings and in particular to FIG. 1, there is graphically illustrated the function of a permute instruction according to the prior art. As shown, a permute mask is stored in a register 31, and values that are to be used to form the final result are stored in data registers 32 and 33. The permute instruction uses the values of the permute mask in register 31 to assign corresponding values stored in registers 32 and 33 to a result register 34. Each of registers 31–34 is 16 bytes (i.e., 128 bits) long. The permute instruction enables any one of the 32 source bytes from data registers 32 and 33 to be mapped to any location within result register 34. In the example shown in FIG. 1, byte 1 of register 32 is mapped to byte 0 of result register 34, byte 14 of register 33 is mapped to byte 1 of result register 34, and byte 18 of register 33 is mapped to byte 2 of result register 34, and so on and so forth.

However, the above-mentioned operation is limited in granularity to discrete immutable 8-bit bytes. In other words, the above-mentioned operation does not permit a program to choose a byte from register 32 that starts in the middle of the byte. Because granularity is often needed is specialized data processing, particularly in encryption algorithms, it would be desirable to provide an improved method and apparatus for performing a permute instruction.

SUMMARY OF THE INVENTION

In accordance with a preferred embodiment of the present invention, a select register, a pair of data registers and a target register are provided. The entries of the select register is preloaded with a set of bit indices. Each of the bit indices points to a desired bit location within the data registers. The byte information stored in the data registers are then copied to the target register according to the bit indices within the select register.

All features and advantages of the present invention will become apparent in the following detailed written description.

BRIEF DESCRIPTION OF THE DRAWINGS

The invention itself, as well as a preferred mode of use, further objects, and advantages thereof, will best be understood by reference to the following detailed description of an illustrative embodiment when read in conjunction with the accompanying drawings, wherein.

DETAILED DESCRIPTION OF A PREFERRED EMBODIMENT

The present invention may be implemented in reduced instruction set computing (RISC) processors or complex instruction set computing (CISC) processors. For the purpose of illustration, a preferred embodiment of the present invention, as described below, is implemented on a RISC processor, such as the PowerPC™ family processor manufactured by the International Business Machines Corporation of Armonk, N.Y.

Figure 1:
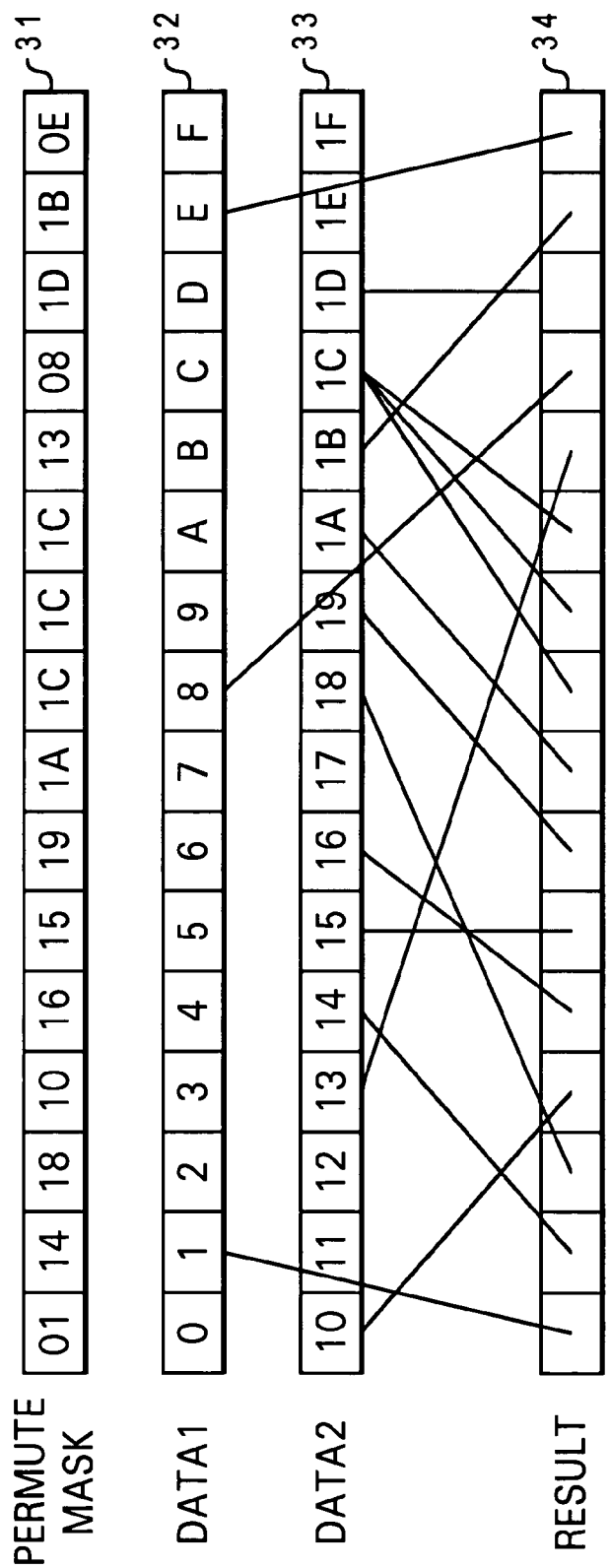
FIG. 1 graphically illustrates the function of a permute instruction according to the prior art.
Figure 2:
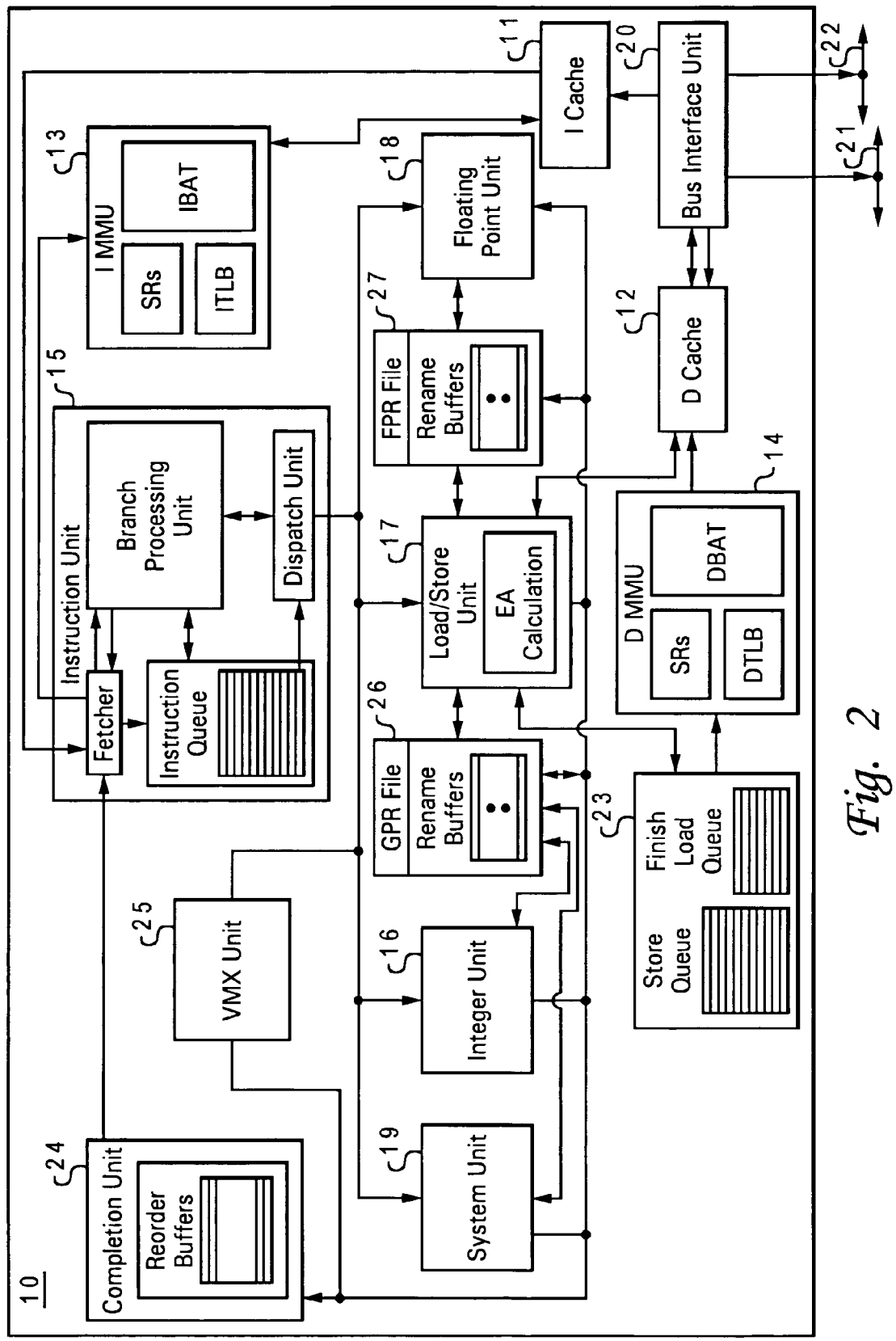
FIG. 2 is a block diagram of a processor in which a preferred embodiment of the present invention is incorporated.

With reference now to FIG. 2, there is depicted a block diagram of a processor in which a preferred embodiment of the present invention is incorporated. As shown, a processor 10 includes an instruction cache 11 and a data cache 12, which are associated with memory management units 13 and 14, respectively. Processor 10 is connected to a system address bus 22 and to a system data bus 21 via a bus interface unit 20. Instructions are retrieved from a system memory (not shown) to processor 10 through bus interface unit 20 and are stored in instruction cache 11, while data retrieved through bus interface unit 20 are stored in data cache 12. Instructions are fetched as needed from instruction cache 11 by an instruction unit 15 that includes an instruction fetcher, a branch prediction module, an instruction queue and a dispatch unit.

The dispatch unit within instruction unit 15 dispatches instructions as appropriate to executions units such as a system unit 19, an integer unit 16, a floating-point unit 18, or a load/store unit 17. System unit 19 executes condition register logical, special register transfer, and other system instructions. Integer unit 16 performs add, subtract, multiply, divide, shift or rotate operations on integers, retrieving operands from and storing results to general-purpose registers 26. Floating-point unit 18 performs single-precision and/or double-precision multiply/add operations, retrieving operands from and storing results to floating-point registers 27.

Load/store unit 17 loads instruction operands from data cache 12 into registers 26 or 27 as needed, and stores instructions results when available from registers 26 or 27 into data cache 12. Load and store queues 23 are utilized for transfers from data cache 12 to and from registers 26 or 27. Completion unit 24, which includes reorder buffers, operates in conjunction with instruction unit 15 to support out-of-order instruction processing, and also operates in connection with rename buffers within registers 26 and 27 to avoid conflict for a specific register for instruction results.

In addition, processor 10 also includes a vector multimedia extension (VMX) unit 25. VMX unit 25 performs byte reordering, packing, unpacking, and shifting, vector add, multiply, average, and compare, and other operations commonly required for multimedia applications.

Figure 3:
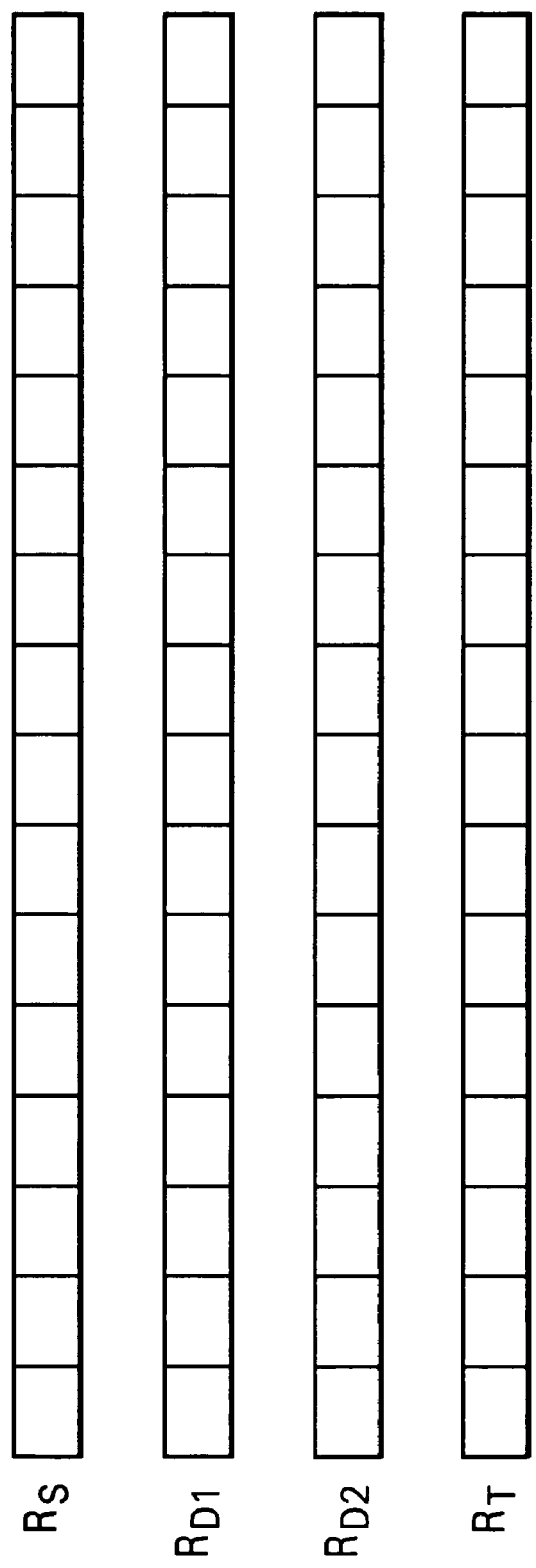
FIG. 3 is a block diagram of the registers required by a bit-aligned permute instruction, in accordance with a preferred embodiment of the present invention.

Referring now to FIG. 3, there is depicted a block diagram of the registers required by a bit-aligned permute instruction, in accordance with a preferred embodiment of the present invention. A bit-aligned permute instruction preferably operates on four separate registers. As shown, the four registers are a select register $R_S$, a first data register $R_{D1}$, a second register $R_{D2}$ and a target register $R_T$. In the present embodiment, select register $R_S$, first data register $R_{D1}$, second register $R_{D2}$ and target register $R_T$ are all 16-byte in length. In addition, second data register $R_{D2}$ are concatenated to first register $R_{D1}$ to form a 32-byte long data register.

Initially, a permute mask is stored in select register $R_S$. The values of the permute mask are pre-calculated to allow corresponding values stored in data registers $R_{D1}$ and $R_{D2}$ to be assigned to target register $R_T$. The values stored in first data register $R_{D1}$ and second register $R_{D2}$ are values intended to be used to form the final result in target register $R_T$. Any one of 256 (32 bytes*8 bits) bits from data registers $R_{D1}$ and $R_{D2}$ can be mapped to a location within target register $R_T$.

Figure 4:
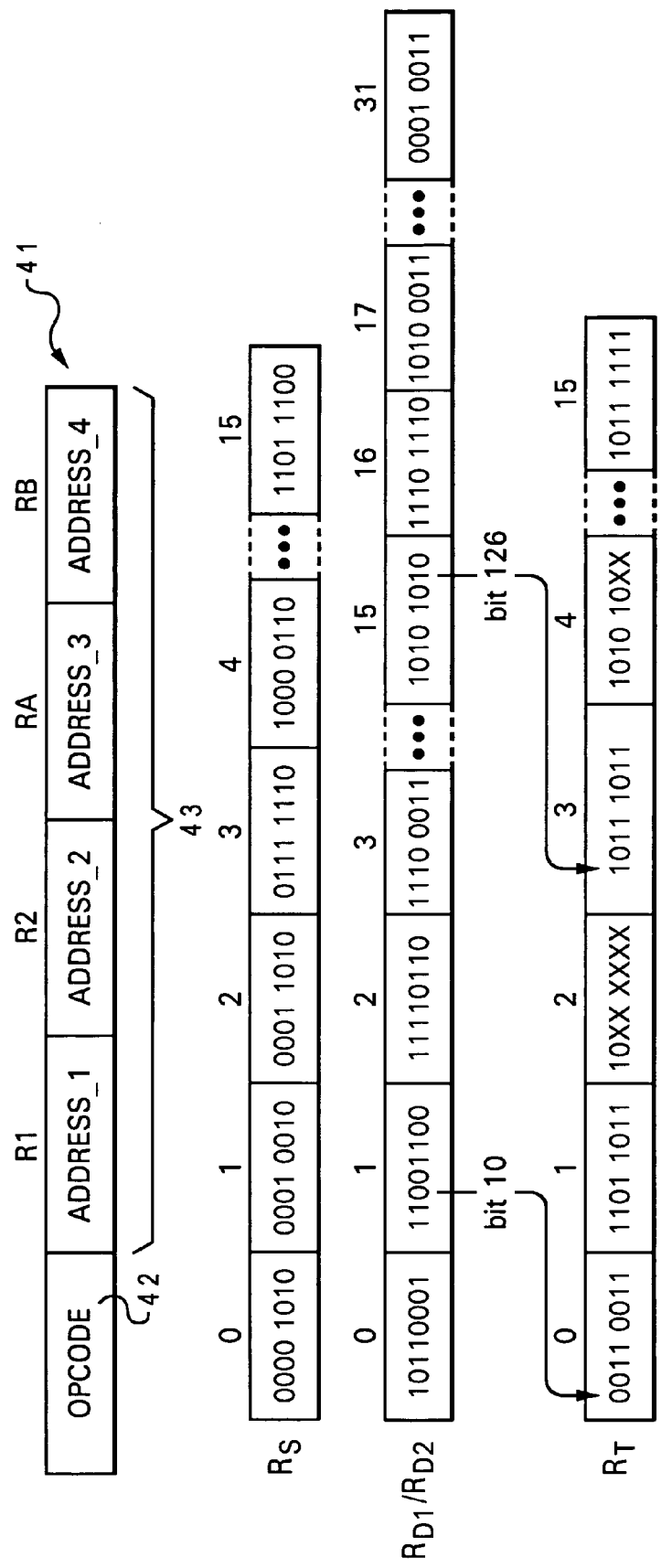
FIG. 4 is a first example of the usage of a bit-aligned permute instruction, in accordance with a preferred embodiment of the present invention.

Along with an appropriate opcode, a bit-aligned permute instruction for accessing select register $R_S$, first data register $R_{D1}$, second register $R_{D2}$ and target register $R_T$ preferably includes the following four operands:

$R_A, R_B, R_1, R_2$ where
$R_A$=the address of select register $R_S$
$R_B$=the address of target register $R_T$
$R_1$=the address of first data register $R_{D1}$
$R_2$=the address of second data register $R_{D2}$ With reference now to FIG. 4, there is graphically illustrated an example of the usage of a bit-aligned permute instruction, in accordance with a preferred embodiment of the present invention. As shown, a bit-aligned permute instruction 41 includes an opcode field 42 and operand fields 43. Opcode field 42 includes the operation code for bit-aligned permute instruction 41. Operand fields 43 includes the address locations for select register $R_S$, target register $R_T$ and data registers $R_{D1}/R_{D2}$. In the present example, select register $R_S$ is located at address_1, target register $R_T$ is located at address_2 first data register $R_{D1}$ is located at address_3, and second data register $R_{D2}$ is located at address_4.

Initially, a permute mask is stored in select register $R_S$. The values of the permute mask are pre-calculated to allow corresponding values stored in data registers $R_{D1}/R_{D2}$ to be copied to target register $R_T$. For example, if an 18-bit input value starting at bit position 10 followed by a 14-bit input value starting at bit position 126 are desired to be copied from data registers $R_{D1}/R_{D2}$ to target register $R_T$, the first three bytes (i.e., bytes 0–2) of select register $R_S$ are loaded with "0000 1010," "0001 0010" and "0001 1010," respectively, to provide the 18-bit input value starting at bit position 10. Then, the next two bytes (i.e., bytes 3–4) of select register $R_S$ are loaded with "0111 1110" and "1000 0110," respectively, to provide the 14-bit input value starting at bit position 126.

As mentioned above, second data register RD2 are concatenated with first data register $R_{D1}$ to form continuous data registers $R_{D1}/R_{D2}$ such that any one of the 256 (32 bytes * 8 bits) bits within data registers $R_{D1}/R_{D2}$ can be mapped to any location within target register $R_T$, according to the permute mask stored in select register $R_S$. Thus, byte 0 of target register $R_T$ is filled with a byte of information from data registers $R_{D1}/R_{D2}$ starting at bit position 10, as indicated by byte 0 of select register $R_S$. Similarly, byte 1 of target register $R_T$ is filled with a byte of information from data registers $R_{D1}/R_{D2}$ starting at bit position 18, as indicated by byte 1 of select register $R_S$, and byte 2 of target register $R_T$ is filled with a byte of information from data registers $R_{D1}/R_{D2}$ starting at bit position 26, as indicated by byte 2 of select register $R_S$. Although byte 2 of target register $R_T$ includes all eight bits of information from data registers $R_{D1}/R_{D2}$, the last six bits of byte 2 of target register $R_T$ are don't care bit because only 18 bits (bits 10–27) of information are required for the 18-bit input value starting at bit position 10.

As for the 14-bit input value starting at bit position 126, byte 3 of target register $R_T$ is filled with a byte of information from data registers $R_{D1}/R_{D2}$ starting at bit position 126, as indicated by byte 3 of select register $R_S$, and byte 4 of target register $R_T$ is filled with a byte of information from data registers $R_{D1}/R_{D2}$ starting at bit position 134, as indicated by byte 4 of select register $R_S$. Although byte 4 of target register $R_T$ includes all eight bits of information from data registers $R_{D1}/R_{D2}$, the last two bits of byte 4 of target register $R_T$ are don't care bits because only 14 bits of information are required for the 14-bit input value starting at bit position 126.

Because of the don't care bits in byte 2 of target register $R_T$, it is clear from FIG. 4 that the 18-bit input value starting at bit position 10 does not line up with the 14-bit input value starting at bit position 126 at the byte boundary between bytes 2 and 3 of target register $R_T$. For some applications, it is desirable to have the 14-bit input value starting at bit position 126 to begin right after the 18-bit input value starting at bit position 10 (i.e., without being separated by the don't care bits).

Figure 5:
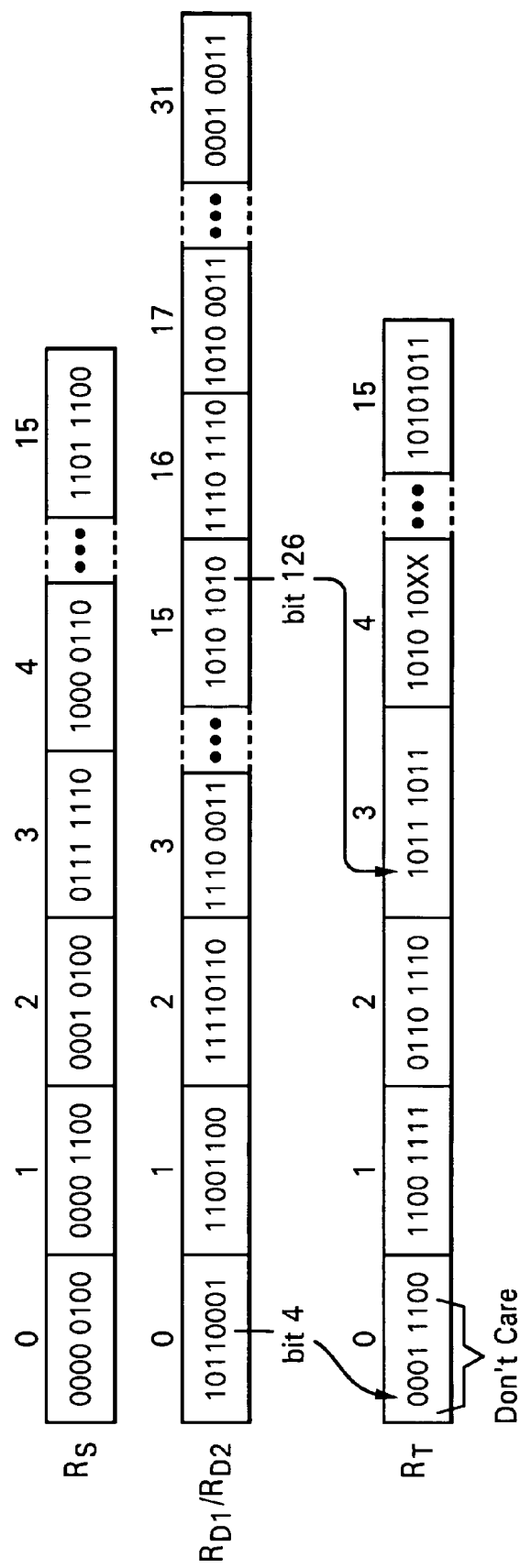
FIG. 5 is a second example of the usage of a bit-aligned permute instruction, in accordance with a preferred embodiment of the present invention.

In order to accommodate those applications, the values of the permute mask need to be adjusted during the pre-calculation accordingly. For the present example, the index values of the first three bytes in select register $R_S$ need to be offset by 6 bits. Thus, bytes 0–2 of select register $R_S$ are loaded with "0000 0100," "0000 1100" and "0001 0100," respectively, to provide the 18-bit input value starting at bit position 10, as shown in FIG. 5. Offset is not required for the index values of the next two bytes in select register $R_S$. Thus, bytes 3–4 of select register $R_S$ are loaded with "0111 1110" and "1000 0110," respectively, to provide the 14-bit input value starting at bit position 126. As such, the 18-bit input value starting at bit position 10 line up exactly with the 14-bit input value starting at bit position 126 at the byte boundary bytes 2 and 3 of target register $R_T$.

As has been described, the present invention provides an improved method and apparatus for performing a bit-aligned permute instruction within a data processing system.

While the invention has been particularly shown and described with reference to a preferred embodiment, it will be understood by those skilled in the art that various changes in form and detail may be made therein without departing from the spirit and scope of the invention.

What is claimed is:

1. A method for performing a permute instruction in a data processing system, said method comprising:
    providing a select register, a plurality of data registers and a target register;
    preloading a plurality of entries of said select register with a plurality of bit index groups, wherein each of said plurality of bit index groups is capable of pointing to any bit location within said plurality of data registers; and
    filling each entry of said target register by copying byte information stored in said plurality of data registers according to each of said plurality of bit index groups within said select register such that said target register is filled with data values from said plurality of data registers in an order defined by said permute instruction.

2. The method of claim 1, wherein said method further includes concatenating said plurality of data registers.

3. The method of claim 1, wherein said preloading further includes adjusting bits within said plurality of bit index groups such that a first input value starting at a first bit position of said plurality of data registers lines up exactly with a second input value starting at a second bit position of said plurality of data registers at a byte boundary of said target register.

4. An apparatus for performing a permute instruction in a data processing system, said apparatus comprising:
    a select register, a plurality of data registers and a target register;
    means for preloading a plurality of entries of said select register with a plurality of bit index groups, wherein each of said plurality of bit index groups is capable of pointing to any bit location within said plurality of data registers; and
    means for filling each entry of said target register by copying byte information stored in said plurality of data registers according to each of said plurality of bit index groups within said select register such that said target register is filled with data values from said plurality of data registers in an order defined by said permute instruction.

5. The apparatus of claim 4, wherein said apparatus further includes means for concatenating said plurality of data registers.

6. The apparatus of claim 4, wherein said means for preloading further includes adjusting bits within said plurality of bit index groups such that a first input value starting at a first bit position of said plurality of data registers lines up exactly with a second input value starting at a second bit position of said plurality of data registers at a byte boundary of said target register.

* * * * *